UNITED STATES PATENT OFFICE.

AUGUST BLANK, CARL HEIDENREICH, AND JOHANNES JANSEN, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

COTTON-DYES.

1,090,379. Specification of Letters Patent. Patented Mar. 17, 1914.

No Drawing. Application filed April 1, 1913. Serial No. 758,113.

*To all whom it may concern:*

Be it known that we, AUGUST BLANK, CARL HEIDENREICH, and JOHANNES JANSEN, doctors of philosophy, chemists, citizens of the German Empire, residing at Leverkusen, near Cologne-on-the-Rhine, Germany, have invented new and useful Improvements in Cotton-Dyes, of which the following is a specification.

We have found that new and valuable cotton dyes can be obtained by combining two molecules of a diazotized acidyl-para-diamin with one molecule of the 5.5'-dioxy-2.2'-dinaphthylamin-7.7'-disulfonic acid of the formula:

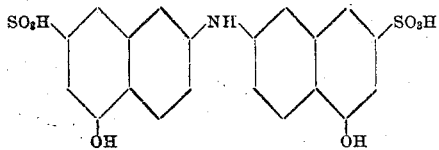

splitting off the acidyl radicals, tetrazotizing, and coupling the resulting tetrazo compounds with an azodyestuff component containing one or more auxochrome groups in meta position, *e. g.* OH or $NH_2$, which enable after-treatment with formaldehyde, such as resorcin, a meta-diamin, meta-aminophenol or their derivatives. The new products dye cotton generally blue bright shades. The colors are rendered fast to washing by aftertreatment with formaldehyde of fibers dyed with them. They are after being dried and pulverized in the shape of their alkaline salts dark powders soluble in water and in concentrated sulfuric acid generally with a blue coloration; yielding upon reduction with stannous chlorid and hydrochloric acid the 6.6'-diamino-5.5'-dioxy-2.2'-dinaphthylamin-7.7'-disulfonic acid, a para-diamin and an amin and having a constitution corresponding to the formula:

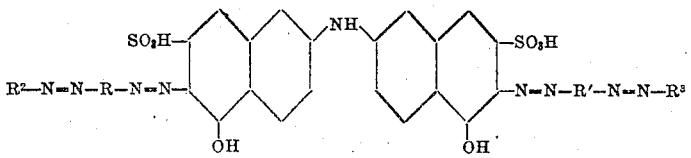

in which R and R' are aromatic nuclei *e. g.* of the benzene or naphthalene series, and $R^2$ and $R^3$ are end components containing auxochrome groups in meta position to each other.

In order to illustrate the new process more fully the following example is given, the parts being by weight:—30 parts of para-aminoacetanilid are diazotized with 60 parts of concentrated hydrochloric acid (1.16 specific gravity) and 13.8 parts of nitrite. The diazo solution is then added to a solution cooled to zero of 50.5 parts of the 5.5'-dioxy-2.2'-dinaphthylamin-7.7'-disulfonic acid (sodium salt) in 1000 parts of water and 42 parts of calcined soda. The mixture is stirred during 1-2 hours, heated to 90° C. and kept at this temperature during half an hour after the addition of 300 parts of a 33 per cent. caustic soda lye. Subsequently the mixture is neutralized with HCl and the dye is salted out and filtered off. It is then stirred up with 1500 parts of water, rendered slightly alkaline with caustic soda lye, cooled to 10° C., acidulated with 60 parts of hydrochloric acid and 13.8 parts of sodium nitrite and stirred during 6 hours. To the mixture thus obtained is then introduced a solution of 22 parts of resorcin in 1000 parts of water containing 60 parts of calcined sodium carbonate. The mixture is heated to 60–70° C. and the dye is salted out and filtered off. It is after being dried and pulverized in the shape of its sodium salt a blue-black powder soluble in water with a blue coloration, soluble in concentrated sulfuric acid (66° Bé.) with a blue coloration. Upon treatment with stannous chlorid and hydrochloric acid it is split up, the 6.6'-diamino- 5.5'-dioxy-2.2'-dinaphthylamin - 7.7' - disulfonic acid, para-phenylenediamin and aminoresorcin are obtained. It dyes cotton reddish-blue and has in a free state most probably the formula:

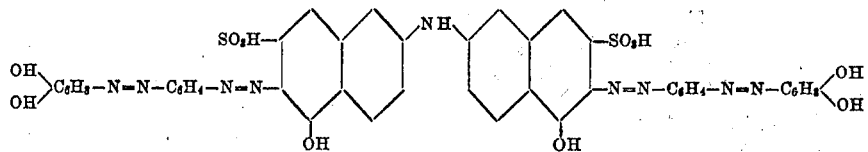

Other diamins e. g. 2-oxalylamino-5-amino-para-xylol, 2-amino-5-acetylaminotoluene, 2 - oxalylamino - 4 - methyl - 5 - amino-anisol, acidyl - 1.4-naphthylenediamin-6-sulfonic acid, etc.

Instead of resorcin other components, such as meta - phenylenediamin, meta - aminophenol, etc., can be used.

We claim:—

1. The herein described new dyestuffs having a constitution corresponding to the formula:

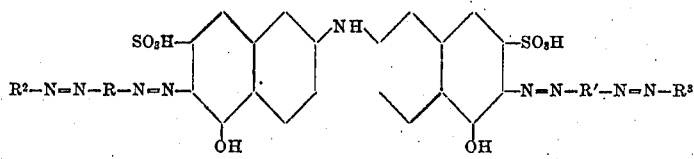

which dyes are after being dried and pulverized in the shape of their alkaline salts dark powders soluble in water and in concentrated sulfuric acid generally with a blue coloration; yielding upon reduction with stannous chlorid and hydrochloric acid the 6.6' - diamino - 5.5' - dioxy - 2.2' - dinaphthylamin - 7.7' - disulfonic acid, a para - diamin and an amin; and dyeing cotton generally blue bright shades which are rendered fast to washing by an aftertreatment with formaldehyde, substantially as described.

2. The hereindescribed new dyestuffs having a constitution corresponding to the formula:

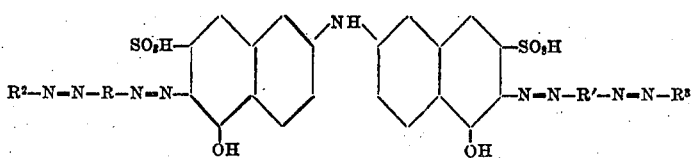

in which R and R' are aromatic nuclei of the benzene series, and R² and R³ end components of the benzene series having auxochrome groups in meta position to each other which dyes are after being dried and pulverized in the shape of their alkaline salts dark powders soluble in water and in concentrated sulfuric acid generally with a blue coloration; yielding upon reduction with stannous chlorid and hydrochloric acid the 6.6' - diamino - 5.5' - dioxy - 2.2' - dinaphthylamin - 7.7' - disulfonic acid, a para - diamin and an amin; and dyeing cotton generally bright blue shades which are rendered fast to washing by an after-treatment with formaldehyde, substantially as described.

3. The hereindescribed new dyestuffs having a constitution corresponding to the formula:

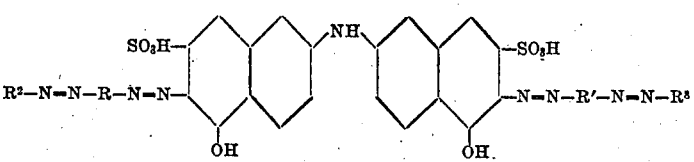

in which R and R' are aromatic nuclei of the benzene series, and R² and R³ end components of the benzene series having auxochrome groups in meta position to each other one at least of which is an OH group which dyes are after being dried and pulverized in the shape of their alkaline salts dark powders soluble in water and in concentrated sulfuric acid generally with a blue coloration; yielding upon reduction with stannous chlorid and hydrochloric acid the 6.6'-diamino - 5.5' - dioxy - 2.2' - dinaphthylamin - 7.7' - disulfonic acid, a para - diamin and an amin; and dyeing cotton generally bright blue shades which are rendered fast to washing by an after treatment with formaldehyde, substantially as described.

4. The herein described new dyestuff having in a free state most probably the formula:

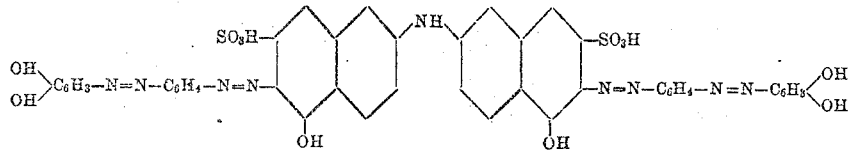

which is after being dried and pulverized in the shape of its sodium salt a blue-black powder soluble in water with a blue and in concentrated sulfuric acid (66° Bé.) with a blue coloration; yielding upon treatment with stannous chlorid and hydrochloric acid the 6.6′ - diamino - 5.5′ - dioxy - 2.2′ - dinaphthylamin - 7.7′ - disulfonic acid, paraphenylenediamin and amino-resorcin; and dyeing cotton blue shades, rendered fast to washing by an aftertreatment with formaldehyde, substantially as described.

In testimony whereof we have hereunto set our hands in the presence of two subscribing witnesses.

AUGUST BLANK. [L. S.]
CARL HEIDENREICH. [L. S.]
JOHANNES JANSEN. [L. S.]

Witnesses:
 HELEN NUFER,
 DORA NUFER.

---

Correction in Letters Patent No. 1,090,379.

It is hereby certified that in Letters Patent No. 1,090,379, granted March 17, 1914, upon the application of August Blank, Carl Heidenreich, and Johannes Jansen, of Leverkusen, near Cologne, Germany, an error appears in the printed specification requiring correction as follows: Page 2, second formula, for

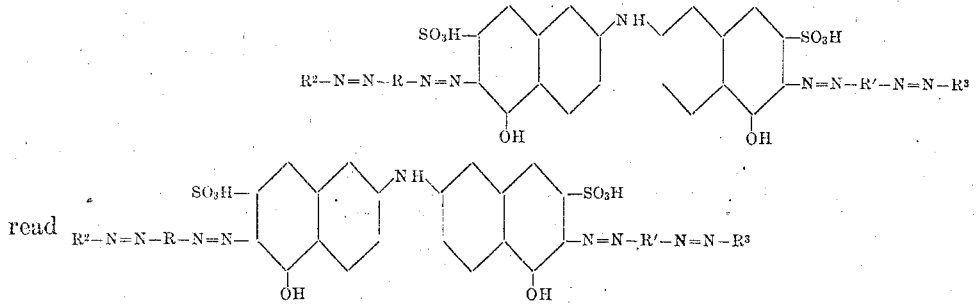

and that the said Letters Patent should be read with this correction therein that the same may conform to the record of the case in the Patent Office.

Signed and sealed this 12th day of May, A. D., 1914.

[SEAL.]

J. T. NEWTON,
*Acting Commissioner of Patents*